United States Patent
Van Cleve et al.

[11] Patent Number: 5,861,561
[45] Date of Patent: Jan. 19, 1999

[54] BYPASS TYPE CORIOLIS EFFECT FLOWMETER

[75] Inventors: Craig Brainerd Van Cleve, Lyons; Roger Scott Loving, Boulder, both of Colo.

[73] Assignee: Micro Motion, Inc., Boulder, Colo.

[21] Appl. No.: 805,474

[22] Filed: Feb. 25, 1997

Related U.S. Application Data

[63] Continuation-in-part of Ser. No. 587,550, Jan. 17, 1996, abandoned.

[51] Int. Cl.⁶ .............................. G01F 1/84; G01F 5/00
[52] U.S. Cl. .................. 73/861.52; 73/202; 73/861.356
[58] Field of Search ...................... 73/861.355, 861.356, 73/861.357, 54.06, 54.24, 202, 861.61, 861.63, 861.64

[56] References Cited

U.S. PATENT DOCUMENTS

| | | | |
|---|---|---|---|
| 3,314,290 | 4/1967 | Peranio | 73/202 |
| 4,381,668 | 5/1983 | Sato et al. | 73/202 |
| 5,297,426 | 3/1994 | Kane et al. | 73/202 |
| 5,333,496 | 8/1994 | Fenelon | 73/202 |
| 5,347,874 | 9/1994 | Kalotay et al. | 73/202 |
| 5,359,881 | 11/1994 | Kalotay et al. | 73/54.06 |

FOREIGN PATENT DOCUMENTS

| | | | |
|---|---|---|---|
| 0 542 090 A2 | 11/1992 | European Pat. Off. | 1/88 |
| 0 552 916 A1 | 1/1993 | European Pat. Off. | 1/36 |
| WO 94/17375 | 1/1994 | WIPO | 1/84 |

OTHER PUBLICATIONS

Insertion vs. In–Line Flowmeters; Balancing Accuracy Against Cost; Keith Larson; Control Jul. 1994.

Bypass Flowmeters; Process Measurement & Analysis, 3rd Edition, Bela G. Liptak; Chilton Book Co., pp. 367–371.

*Primary Examiner*—Richard Chilcot
*Assistant Examiner*—Harshad Patel
*Attorney, Agent, or Firm*—Duft, Graziano & Forset P.C.

[57] ABSTRACT

A bypass flowmeter for measuring the material flow in a conduit. An optimum pressure drop is developed across the flowmeter by coupling the material outlet of the flowmeter to the throat of a venturi positioned within the conduit. This increased pressure drop improves the material flow rate through the flowmeter. This enhances flowmeter accuracy and sensitivity and the flowmeter's ability to measure mass flow rates for low density materials such as gas. The ratio of the material flow within the flowmeter to that of the conduit is derived with improved precision over prior arrangements which assume a constant ratio of material flow between the flowmeter and the conduit. The material flow information for the conduit is obtained for materials having a varying viscosity by the use of a differential pressure sensor which measures the pressure drop across the flowmeter and transmits this information to instrumentation which uses it to derive material flow information for the conduit with improved precision. An alternative embodiment not having a venturi operates in the same manner to derive the material flow ratio between the flowmeter and the conduit and, in turn, the total material flow in the conduit.

37 Claims, 5 Drawing Sheets

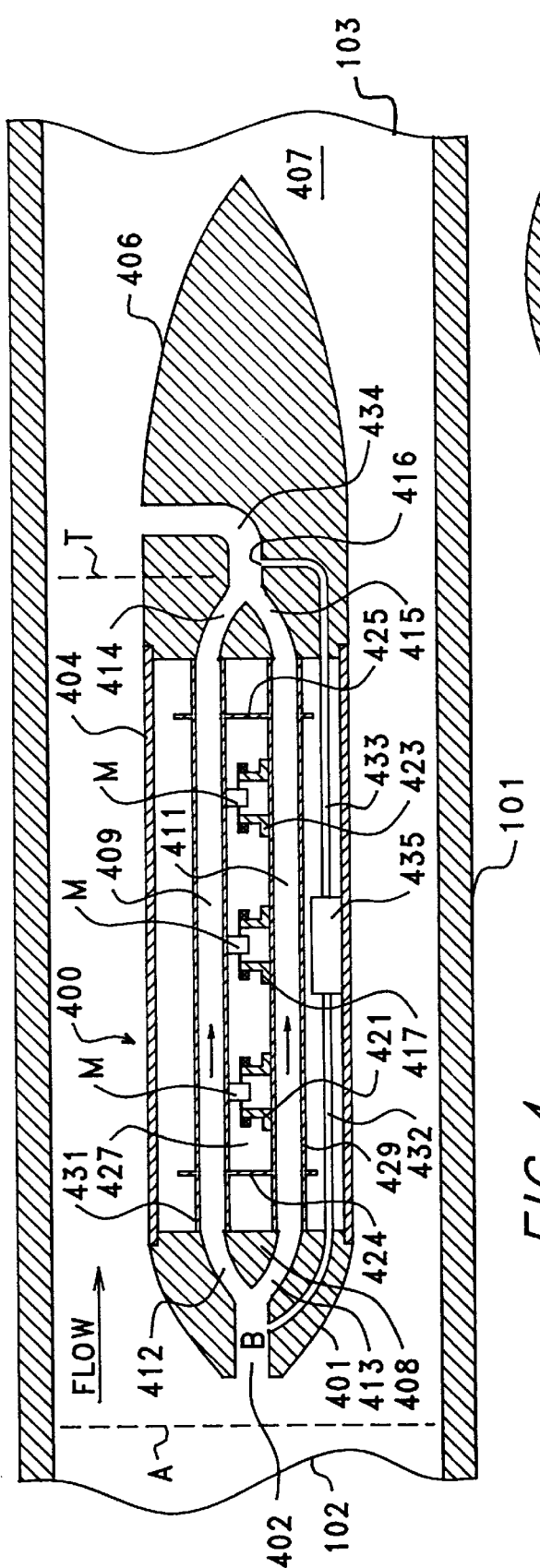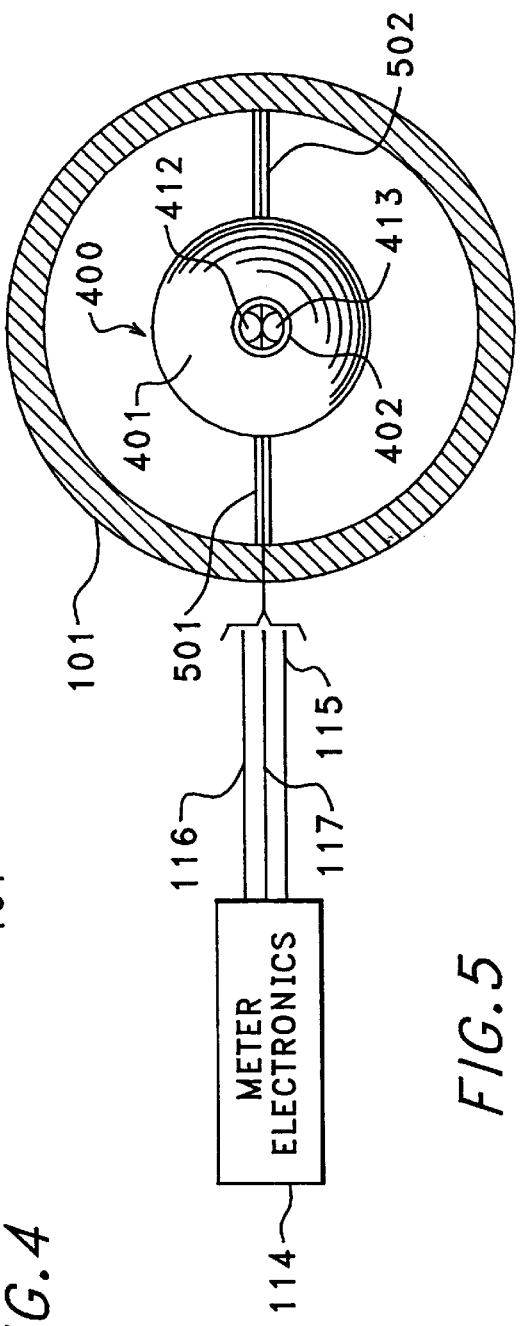
FIG.4
FIG.5

BYPASS TYPE CORIOLIS EFFECT FLOWMETER

RELATED APPLICATIONS

This application is a continuation in part of U.S. application Ser. No. 08/587,550 filed 17 Jan. 1996, now abandoned, and whose disclosure is hereby incorporated by reference to the same extent as if fully set forth herein.

FIELD OF INVENTION

This invention relates to a Coriolis effect mass flowmeter and more particularly, to a Coriolis effect mass flowmeter of the bypass type that is coupled to a conduit for measuring and deriving information pertaining to material flow in the conduit.

PROBLEM

Coriolis effect mass flowmeters measure mass flow and other information for materials flowing through a conduit. Such flowmeters are disclosed in U.S. Pat. Nos. 4,109,524 of Aug. 29, 1978, 4,491,025 of Jan. 1, 1985, and Re. 31,450 of Feb. 11, 1982, all to J. E. Smith et al. These flowmeters have one or more flow tubes of straight or curved configuration. Information regarding the characteristics of material flowing in a Coriolis mass flowmeter must be derived with great accuracy since it is often a requirement that the derived flow rate information have an error of less than 0.15% of reading. These flowmeter output signals are sinusoidal and are displaced in time or phase by an amount determined by the Coriolis forces generated by the flowmeter through which the material flows. The signal processing circuitry which receives these sensor output signals measures this time difference with precision and generates the desired characteristics of the flowing process material to the required error of less than 0.15% of reading.

Coriolis mass flowmeters may be operated on a full flow or bypass basis. They are generally operated on a full flow basis in applications wherein the diameter of the conduit whose material flow is to be measured is sufficiently small so that a commercially available mass Coriolis flowmeter can be used to receive the entire material flow in the conduit.

The currently available Coriolis mass flowmeters are not capable of operating on a full flow basis with conduits having a diameter of greater than 6 inches or about 150 mm. However, it is often necessary to measure material flow in conduits whose diameter is greater than that of the commercially available Coriolis full flowmeters. In these applications, the material flow may occasionally be measured on a bypass basis by a volumetric flowmeter coupled to the conduit so that some of the material flow in the conduit is diverted to flow through a bypass flowmeter while the remainder of the material flows through the conduit. The volumetric flowmeter measures the material flow within its bypass channel and outputs its inferred information regarding the material flow within the conduit. A problem associated with the use of the volumetric bypass flowmeters is that the ratio of the flow through the meter to that through the conduit can vary with fluid properties, including density, velocity, and viscosity. Since volumetric meters do not measure all of these properties, they are unable to compensate for variation in the flow ratio. Thus the inferred total flow rate is likely to be in error.

Another problem with volumetric bypass flowmeters is that they require the mass flow rate to be calculated from the material density which is not measured by these meters but is determined from calculations using temperature, pressure, and material characteristics. A Coriolis flowmeter offers greater accuracy, and the ability to measure mass flow directly. Their use is therefore preferred over that of volumetric flowmeters.

Although the currently available Coriolis flowmeters are satisfactory for full flow applications, their output information is not sufficient for bypass applications requiring comparable accuracy. Their main problem is that, like volumetric bypass meters, the ratio of the material flow through the flowmeter to that through the conduit often varies with the material density, velocity, and viscosity. This variation causes inaccuracies in the flow calculation derived for the conduit.

The prior art, such as U.S. Pat. No. 5,333,496, has ignored these possible inaccuracies and has assumed a constant material flow ratio between the bypass flowmeter and the conduit. This constant ratio is based upon the cross sectional area of the flowmeter tube and the cross sectional area of the conduit whose material flow is to be measured. The use of a constant material flow ratio may be acceptable for use with applications wherein high accuracy is of no concern or wherein actual flow ratio variations are held to a minimum with the use of material having a constant density, viscosity, and flow rate. However, the assumption of a constant ratio is not acceptable in applications where high accuracy information for material flow within the conduit is desired. This is particularly the case when measuring conduit flow for materials whose density and/or viscosity is not constant.

The typical Coriolis mass flowmeter can provide output information regarding the mass flow rate and volumetric flow rate of the material within it. It can also provide output information regarding the density of the flowing material. The density information is derived from the resonant frequency of the flowmeter flow tubes. U.S. Pat. No. 5,359,881 to Kalotay et al., discloses a Coriolis flowmeter having an internal differential pressure sensor that permits the flowmeter and its associated electronics to provide viscosity information as well as density, mass flow rate, and volumetric flow rate for the material flowing within it. Thus, the Kalotay et al., flowmeter, when operated as a bypass flowmeter coupled to a large conduit, would eliminate some of the problems associated with the calculation of the material flow ratio between the flowmeter and the conduit by generating output information for the variable parameters of material density and viscosity. However, Kalotay discloses only the flowmeter structure per se including a differential pressure sensor that permits a viscosity calculation. Kalotay does not teach how the output information of his meter could be used to determine the ratio of material flow within his flowmeter to that of a conduit to which his flowmeter might be connected on a bypass basis.

Another problem with the use of Coriolis flowmeters on a bypass basis is that they require a relatively large pressure differential between their inlet and outlet in order to operate in their most accurate flow range. In current bypass flowmeters, this is achieved by an orifice plate or venturi located in the conduit between the meter inlet and the meter outlet. The orifice plate or venturi create a pressure drop which drives material through the flowmeter. The problem with an orifice plate is that the pressure is permanently lost from the system.

It can be seen that the traditional use of Coriolis (and volumetric) bypass flowmeters, wherein the flow ratio is assumed to be constant, creates problems which cause them to generate output information that is not always as accurate as is required in certain installations. Furthermore, it can be seen that the use of orifice plates to generate enough pressure drop for Coriolis meters to operate in their most accurate flow range is undesirable because of energy loss.

SOLUTION

The present invention overcomes the above identified problems and achieves an advance in the art by providing a Coriolis bypass flowmeter system whose total pressure drop in a connected conduit is lower than that produced by either a Coriolis meter or an orifice plate. Furthermore, the present invention's derived material flow output information is of greater accuracy than that heretofore available.

The Coriolis bypass flowmeters of the present invention overcome the problems associated with the use of orifice plates within a conduit to generate sufficient material flow through the flowmeter. They overcome these problems by the use of a venturi (a converging/diverging nozzle structure) positioned within the interior of the conduit. A material inlet to the flowmeter is positioned upstream (or downstream) of the venturi and a material outlet of the Coriolis bypass flowmeter is positioned at the throat of the venturi. This generates a sizeable pressure drop between the inlet and outlet of the Coriolis bypass flowmeter and, in turn, generates an increased material flow through the Coriolis bypass flowmeter.

Having a high material flow rate through the Coriolis flowmeter reduces measurement error in two ways. The first is due to the fact that much of the error in a standard Coriolis meter (such as meter zero error) is independent of flow rate. For instance a flowmeter might have an uncertainty in the flow rate of one pound per minute. At a flow rate of 10 pounds per minute this can amount to a ten percent error. At a flow rate of 1000 pounds per minute this amounts to only a one tenth of one percent error.

The second way that a high flow rate through the Coriolis flowmeter reduces error has to do with the flow ratio. If the base uncertainty in the flow rate of the Coriolis flowmeter is once again one pound per minute and the flow ratio is one thousand to one, then the uncertainty in the flow through the conduit is one thousand pounds per minute. On the other hand, if the ratio is fifty to one, then the uncertainty in the flow through the conduit is only fifty pounds per minute. The bypass meter's sensitivity to flow is effectively increased by increasing the portion of flow that goes through the Coriolis meter. Thus it becomes obvious that it is desirable to have a high material flow rate through the Coriolis flowmeter.

The problems caused by a net pressure drop in the conduit of the prior art orifice plate bypass flowmeters does not occur in the use of the bypass flowmeter of the present invention. This results from the fact that the present invention uses a venturi to generate a pressure differential, such that the pressure is recovered downstream of the throat of the venturi. The positioning of the material outlet of the bypass flowmeter at the throat of the venturi results in a large pressure differential between the material inlet and outlet of the flowmeter. This differential generates a sizeable material flow through the flowmeter that provides increased flowmeter sensitivity and accuracy. Downstream of the throat of the venturi, the bulk of the pressure is restored to the material in the conduit system. The use of the venturi to generate this pressure differential and, in turn, the increased material flow through the flowmeter is preferable to that of the use of orifice plates and the like whose resulting material turbulence results in lost energy.

The present invention determines the total material flow within the conduit in a new and novel manner. Fluid dynamic equations are derived and show that the flow ratio between the flowmeter and the conduit is a function of the fluid properties and the meter flow rate. The Coriolis meter (along with a differential pressure gage, when necessary) is then used to determine the relevant material properties. The meter microprocessor in an associated electronics element can then be used to calculate the flow velocity in the venturi and the total conduit mass flow rate.

The relevant material properties, as previously discussed, are density, velocity, and viscosity. The Coriolis meter determines the density of the material from the resonant frequency of the vibrating tubes of the flowmeter. It measures the mass flow rate within the meter and from this information along with density and flow tube cross sectional area, it then derives the velocity of the material flow. Pressure drop across the meter is determined with a differential pressure sensor connected between the material inlet and outlet of the flowmeter. The differential pressure provided by the sensor is used to derive the viscosity of the material.

The fluid velocity in the venturi is determined by using the material property values output by the Coriolis meter to solve the appropriate fluid dynamic equation 25 subsequently disclosed herein. Information regarding material flow velocities in the conduit and flowmeter is translated to volumetric flow rates and to mass flow rates using preprogrammed internal dimensions of the flowmeter and conduit along with the continuously measured material density. The mass flow rate within the flowmeter is added to the mass flow rate within the venturi in order to derive the entirety of the mass flow rate within the conduit downstream of the venturi. Thus, the bypass flowmeters of the present invention overcome the problems associated with the use of volumetric bypass flowmeters by operating in such a manner that they continuously measure density and automatically generate output information in terms of either mass or volumetric material flow.

In summary, the generation of an increased flowmeter pressure differential and, in turn, an increased material flow provides a Coriolis bypass flowmeter of increased sensitivity and accuracy that compensates for variations in density and, velocity, and viscosity by directly measuring these parameters.

DESCRIPTION OF THE DRAWINGS

The above and other advantages of the invention can be better understood from the reading of the following detailed description thereof taken in conjunction with the drawing in which:

FIG. 4 discloses a Coriolis bypass flowmeter of the insertion type positioned within the confines of a conduit with the downstream portion of the flowmeter comprising a venturi structure.

FIG. 5 is a cross-section end view of the structure of FIG. 4.

DETAILED DESCRIPTION

Figure 1:
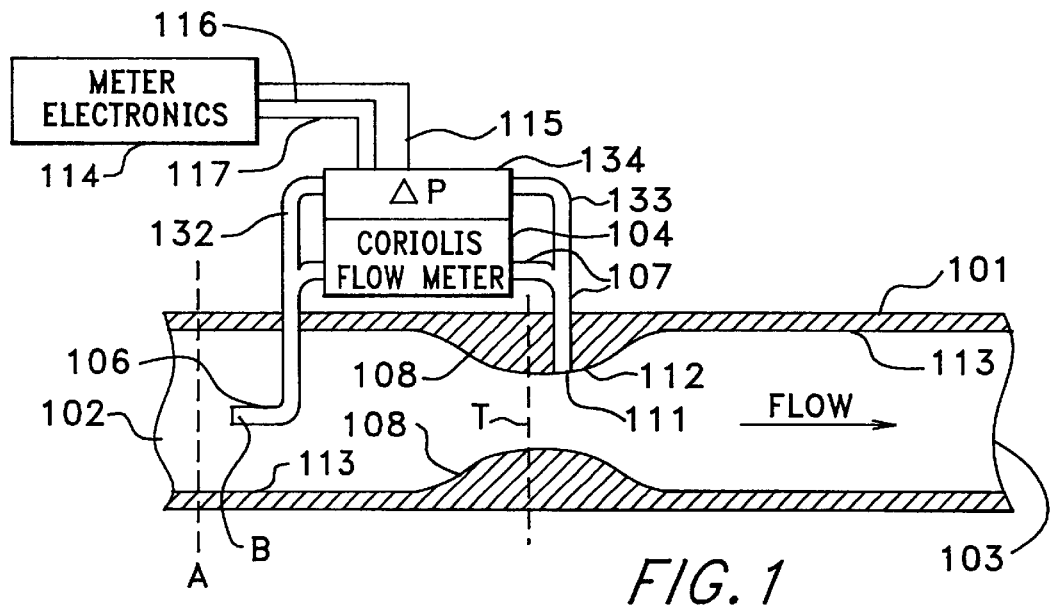
FIG. 1 discloses a vertical cross-section view of a Coriolis flowmeter connected on a bypass basis to a conduit having a venturi affixed to the inner walls of the conduit.

Description of FIG. 1

FIG. 1 discloses a conduit 101 in which material flows from an upstream end 102 to a downstream end 103. A Coriolis flowmeter 104 having an inlet 106 and an outlet 107 is coupled to conduit 101 in order to measure a portion of the material flow in the conduit to derive information pertaining to the entirety of the material flow within the conduit.

The material inlet 106 is positioned within the interior of conduit 101 with the open end of the material inlet 106 facing upstream. This diverts a portion of the material flow into the interior of the material inlet 106. The material that enters inlet 106 flows through Coriolis flowmeter 104 and exits the Coriolis flowmeter 104 at its material outlet 107 which has an opening 111 which is proximate the surface 112 of element 108. Element 108 is affixed to the inner surface 113 of conduit 101. Element 108 forms a venturi having a throat area T.

It can be seen that the opening 111 of outlet 107 is positioned proximate throat T of the venturi. The coupling of material inlet 106 and material outlet 107 of Coriolis flowmeter 104 to conduit 101 permits Coriolis flowmeter 104 to be subjected to an optimum pressure drop. This pressure drop increases the material flow through the Coriolis flowmeter. This increased pressure drop is attained by the positioning of material outlet 111 proximate the throat of the venturi so as to take advantage of the low pressure generated at the venturi throat T as compared to the material pressure at inlet 106 of Coriolis flowmeter 104.

FIG. 1 also discloses a differential pressure gauge 134 connected by means of tubes 132 and 133 to material inlet 106 and material outlet 107 of flowmeter 104. These connections enable the differential pressure gauge 134 to provide a continuous monitoring of the material pressure drop developed across flowmeter 104. Differential pressure gauge 134 transmits this differential pressure information over path 115 to meter electronics 114 which derives a continuous indication of the viscosity of the material flowing through flowmeter 104. As subsequently described in connection with the embodiment of FIG. 4, meter electronics applies a drive signal over path 116 to oscillate the flowmeter tubes and receives signals over path 117 to derive information pertaining to the material flow in flowmeter 104 including the volumetric and mass flow rate of the material. As subsequently described in detail, the meter electronics element 114 uses the measured density information, measured mass flow rate, the measured pressure drop as well as other information including the parameters of the conduit and the flowmeter to derive the ratio of the material flow rate of the flowmeter and the venturi and in turn, the mass flow rate and volumetric flow rate of the entirety of the material flowing within the interior of conduit 101.

Figure 2:
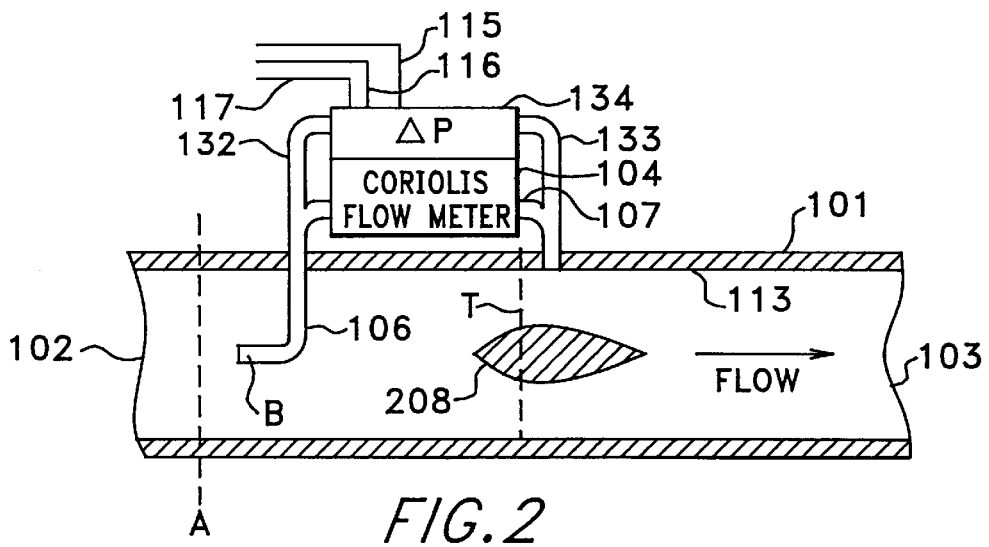
FIG. 2 discloses a vertical cross-section view of a Coriolis flowmeter coupled on a bypass basis to a conduit having an internal venturi structure positioned intermediate to the inner walls of the conduit.
Figure 3:
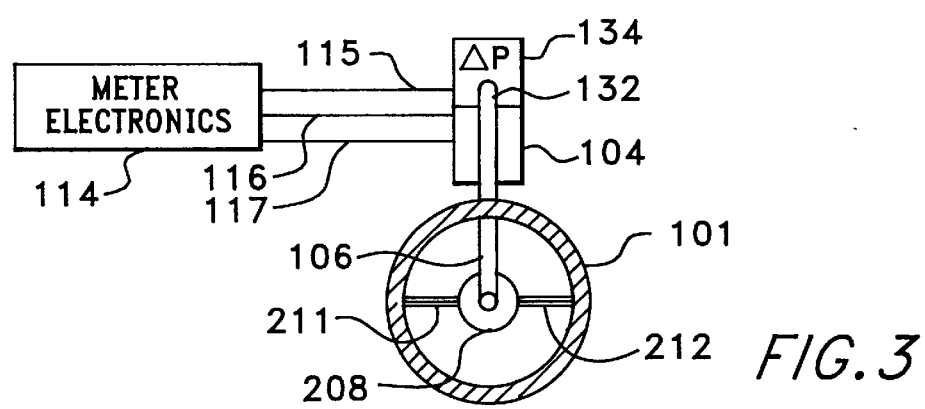
FIG. 3 is a cross-section end view of the structure of FIG. 2.

FIG. 2 discloses an alternative embodiment to that of FIG. 1 wherein like numbers represent the elements of FIG. 2 that directly correspond to similarly designated elements of FIG. 1. The primary difference between the two embodiments is that the embodiment of FIG. 1 has a venturi formed by elements 108 affixed to the inner wall 113 of conduit 101 while in the embodiment of FIG. 2, the venturi comprises a separate venturi element 208 positioned within the interior of the conduit 101. Venturi 208 is held in a fixed position within the conduit 101 by means of support brackets 211 and 212 as shown in FIG. 3.

It has been previously mentioned that it is a problem when using bypass type flowmeters to determine the ratio of the material flow through the flowmeter compared to the material flow through the conduit since the ratio varies with changes in material density and velocity. The present invention solves this problem since Coriolis type flowmeters measure density and can calculate velocity. This allows for the calculation of the flow ratio and thus compensates for changes in material density and velocity.

The embodiment of FIGS. 2 and 3 also includes differential pressure sensor 134 together with conductors/paths 115, 116 and 117 which enable meter electronics 114 to operate in the manner described in connection with FIG. 1 to derive the mass flow rate and volumetric flow rate information for the entirety of the material flow within conduit 101.

As is subsequently described, the differential pressure sensor 134 is not necessary for applications in which the viscosity of the material flow in conduit 101 is a constant. In this case, the differential pressure sensor 134 is not required and the remainder of the disclosed apparatus operates as described to derive flow rate information for conduit 101. However, for applications wherein the material in conduit 101 is not of a constant viscosity, the use of a differential pressure sensor enables meter electronics 114 to derive fluid viscosity. Knowing viscosity allows the determination of the conduit flow rate with improved precision. The differential pressure sensor 134 of FIGS. 1, 2 and 3 need not be an external device as shown in connection with FIG. 1, 2 and 3, but instead may, if desired, be internal to the flowmeter as shown in connection with the embodiment of FIG. 4.

Viscosity can be determined through use of a differential pressure gage to measure the pressure difference between the inlet and outlet of the Coriolis meter. Pressure difference is a function of flow rate and viscosity. Since pressure drop and flow rate are measured, viscosity can be determined as per U.S. Pat. No. 5,359,881.

Calculation of Venturi Material Flow Velocity

The following mathematical derivation shows the dependence of the flow ratio between the flowmeter and the conduit upon velocity(flow rate), density, and viscosity. It also shows how the venturi velocity and the total flow rate of the flowmeter and the conduit may be calculated once these fluid parameters are known.

The flow through the bypass flowmeter 104 of FIGS. 1 and 2 is driven by the pressure differential developed at the throat T of venturi 108. In order to understand how a venturi works it is necessary to understand the components of pressure in flowing material. The first component is static pressure, and is the pressure with which we are most familiar. It is the pressure of static material in conduit 101. Moving material also has a static pressure. It is measured by facing a pressure sampling tube perpendicular to the material flow direction in conduit 101.

The second component is dynamic pressure. It is the kinetic energy of a flowing material and can be measured as the difference in pressure readings from a tube facing upstream and a tube facing perpendicular to the material flow direction. Dynamic pressure is calculated from the equation:

$$P_d = \frac{\rho V^2}{2} \tag{1}$$

$P_d$ = dynamic pressure $\rho$ = material density $V$ = material velocity

The total material pressure, TP, in conduit 101 is the sum of the dynamic and static pressures.

$$TP = P_s + P_d \tag{2}$$

$TP$ = total pressure $P_s$ = static pressure

Neglecting viscous pressure drop, the total pressure TP in venturi 108 is conserved by Bernoullis' law and is equal to that at the upstream end of the conduit at location A. Some of the static pressure Ps is converted to dynamic pressure Pd in throat T and then back to static pressure downstream of venturi 108. A venturi accomplishes this function by the decreased area at throat area T. The decreased area at throat T forces the material velocity to increase, so that the dynamic pressure Pd increases while the static pressure Ps decreases. Downstream of the throat, the conduit area again increases, the material velocity and dynamic pressure decrease, and the static pressure increases. A properly designed venturi can accomplish these conversions with very little drop in total pressure TP.

The material flow in the present invention is driven by the difference between the static pressure Ps at the inlet B which is upstream of venturi throat T and the static pressure Ps at the flowmeter outlet 111.

The total pressure in the upstream portion of conduit 101 at point A is given by the equation:

$$TP_A = P_{sA} + \frac{\rho V_p^2}{2} \tag{3}$$

$Psa$ = static pressure at $A$ $TP_A$ = total pressure at $A$ $V_p$ = velocity in conduit The static pressure in the inlet 106 to flowmeter 104, position B, is equal to the total pressure at A (which by Bernoullis' law is equal to the total pressure at B) minus the dynamic pressure due to the material velocity through the flowmeter. For simplicity in this derivation, it will be assumed that the flowmeter tube, the inlet 106, and the outlet 107 are all of the same diameter and thus all contain material of the same velocity.

$$P_{sB} = TP_A - \frac{\rho V_m^2}{2} \tag{4}$$

$V_m$ = velocity in flowmeter $P_{sB}$ = flowmeter static pressure at $B$

Substituting equation 3 into equation 4 yields:

$$P_{sB} = \left( P_{sA} + \frac{\rho V_p^2}{2} \right) - \frac{\rho V_m^2}{2} \tag{5}$$

$$P_{sB} = P_{sA} + \frac{\rho}{2} (V_p^2 - V_m^2) \tag{6}$$

The static pressure in the outlet 111 of flowmeter 104 is equal to the static pressure in venturi throat T which is equal to the total pressure $TP_A$ minus the dynamic pressure Pd in throat T. This is true since $TP_A = TP_t$.

$$P_{st} = TP_A - \frac{\rho V_t^2}{2} \tag{7}$$

$P_{st}$ = static pressure in throat $V_t$ = venturi throat velocity

Substituting equation 3 into equation 7 yields:

$$P_{st} = \left( P_{sA} + \frac{\rho V_p^2}{2} \right) - \frac{\rho V_t^2}{2} \tag{8}$$

Simplifying equation 8 one gets:

$$P_{st} = P_{sA} + \frac{\rho}{2} (V_p^2 - V_t^2) \tag{9}$$

The difference in static pressure between the inlet and outlet of flowmeter 104 is then given by the equation:

$$\delta P_s = P_{sB} - P_{st} \tag{10}$$

$\delta P_s$ = flowmeter pressure differential

Substituting equations 6 and 9 into equation 10 yields:

$$\delta p_s = \left[ P_{sA} + \frac{\rho}{2} (V_p^2 - V_m^2) \right] - \left[ P_{sA} + \frac{\rho}{2} (V_p^2 - V_t^2) \right] \tag{11}$$

Simplifying equation 11 one gets:

$$\delta P_s = \frac{\rho}{2} (V_t^2 - V_m^2) \tag{12}$$

Thus, neglecting viscous losses in the venturi, it can be seen that the pressure that drives material through the bypass flowmeter 104 is proportional to the difference in velocity squared of material in flowmeter 104 and the venturi throat T. By decreasing the throat area the driving pressure can be increased so that the bypass flowmeter operates in its optimum flow range. The overall pressure drop in the conduit 101 is minimal because of the conversion of the dynamic pressure back to static pressure downstream of the venturi.

The pressure differential driving the material through the bypass meter is given by equation 12. In order to determine the ratio of the flow through flowmeter 104 to that through the venturi 108 it is also necessary to know the resistance to flow or viscous pressure drop through both the flowmeter and the venturi. The equations of resistance to flow through a pipe are dependent on the flow regime (laminar or turbulent) which is a function of the Reynolds number of the material. The Reynolds number is a dimensionless number which is used to characterize flow. The Reynolds number is given by the equation:

$$R_e = \frac{\rho V d}{\mu} \tag{13}$$

$\rho$ = density $V$ = velocity $d$ = pipe diameter $\mu$ = viscosity

A Reynolds number of 2000 to 3000 is generally recognized as the approximate transition zone between laminar and turbulent flow. Since this zone is extended (not an exact point), and since the pressure drop equation for turbulent flow is different than for laminar, an ambiguity exists as to which pressure drop equation (laminar or turbulent) is appropriate. This ambiguity requires the flowmeter of the new invention to be operated at flow rates entirely in the turbulent regime. Fortunately, the use of the venturi to drive the flowmeter flow makes this feasible.

The pressure drop for flow through a pipe is given by the Darcy formula.

$$P_{drop} = f \frac{L}{d} \frac{\rho V^2}{2} \quad (14)$$

$f$ = friction factor $L$ = pipe length $d$ = pipe diameter $V$ = material velocity The Darcy formula is of generic enough form that it is used for different flow regimes (laminar or turbulent), geometries (straight or bent), and surface finishes (smooth or rough). The only difference in the formula for these different conditions is in the friction factor. The friction factor for turbulent flow in smooth straight pipes up to a Reynolds number of about $10^5$ is given by the Blasius equation.

$$f_s = \frac{.316}{R_e^{.25}} \quad (15)$$

$f_s$ = friction factor for smooth straight pipe

The friction factor, $f_b$, for a ninety degree bend in a pipe (as in the bypass flowmeter of FIG. 1) is a constant times the friction factor for a straight pipe.

$$f_b = nf_s \quad (16)$$

$n$ = constant (function of bend radius divided by tube diameter)

n=constant (function of bend radius divided by tube diameter The bypass meter of FIG. 1 has several bends and several straight sections. Since the bend friction factor and straight tube friction factors are of the same form, they can be combined into a single term friction factor for the bypass flowmeter of FIG. 1. This single term is equation 15 multiplied by a constant $$f_m = af_s \quad (17)$$

$f_m$ = meter friction factor $a$ = constant based on the flowmeter

Thus the pressure drop through the meter can be represented by the equation:

$$P_{drop_m} = f_m \frac{L_m}{d_m} \frac{\rho V_m^2}{2} \quad (18)$$

$m$ = subscript denoting flow meter

The viscous loss in the venturi between the flowmeter inlet and outlet can also be represented by the Darcy formula if one uses a representative diameter and velocity. The proper velocity for calculating viscous pressure drop in the venturi is a fraction of the throat velocity, cVt.

$$V_v = cV_t \quad (19)$$

$V_v$ = representative venturi velocity $c$ = constant

The Darcy formula for the venturi then becomes:

$$P_{drop_v} = f_v \frac{L_v}{d_v} \frac{\rho(cV_t)^2}{2} \quad (20)$$

$cVt$ = venturi velocity $fv$ = venturi friction factor $L_v$ = venturi length $d_v$ = venturi diameter This viscous pressure drop for the venturi is added to the venturi pressure differential from equation 12. The sum is the pressure driving the material through the meter.

$$\delta P_s = \frac{\rho}{2}(V_t^2 - V_m^2) + f_v \frac{L_v}{d_v} \frac{\rho(cV_t)^2}{2} \quad (21)$$

$\delta P_s$ = pressure driving material through meter

The pressure drop through the meter is now set equal to the pressure driving the flow through the meter. The ratio of material flow through the meter to material flow through the venturi can then be found by solving the resulting equation for the velocity ratio.

$$\delta P_s = P_{drop_m}$$

Substituting equations 18 and 21 into equation 22 yields:

$$\frac{\rho}{2}(V_t^2 - V_m^2) + f_v \frac{L_v}{d_v} \frac{\rho(cV_t)^2}{2} = af_m \frac{L_m}{d_m} \frac{\rho V_m^2}{2} \quad (23)$$

This equation can be solved for the velocity ratio between the flowmeter meter and the venturi throat.

$$\frac{V_t}{V_m} = \frac{\sqrt{af_m \frac{L_m}{d_m} + 1}}{\sqrt{c^2 f_v \frac{L_v}{d_v} + 1}} \quad (24)$$

Substituting equations 13 and 15 into equation 23:

$$\frac{V_t}{V_m} = \frac{\sqrt{a\left(\frac{.316}{\left(\frac{\rho V_m d_m}{\rho}\right)^{.25}}\right)\frac{L_m}{d_m} + 1}}{\sqrt{c^2\left(\frac{.316}{\left(\frac{\rho cV_t d_v}{\mu}\right)^{.25}}\right)\frac{L_v}{d_v} + 1}} \quad (25)$$

From equation 25 it can be seen that the material velocity ratio is dependant upon not only the known meter and venturi geometric constants, but also on the material density, viscosity, and even material velocity. Traditional volumetric bypass meters can only determine the meter material velocity, $V_m$, but without knowing the density or viscosity they cannot determine the throat velocity, or total flow with accuracy. The use of a Coriolis meter as the bypass meter allows the determination of both material density and velocity. This leaves only viscosity and throat velocity as unknowns. Viscosity can be dealt with in several ways. First, if the viscosity is constant and known, its value can simply be entered into equation 25. If the viscosity is a known function of temperature, it can be calculated using the fluid temperature as measured in the Coriolis meter. (Coriolis meters require the temperature be known in order to compensate for changes in elastic modulus with temperature.) Finally, if viscosity varies in an unknown manner, it can be determined through use of a differential pressure gage to measure the pressure difference between the inlet and outlet of the Coriolis meter. Pressure difference is a function of flow rate and viscosity. Since pressure drop and flow rate are measured, viscosity can be determined as per U.S. Pat. No. 5,359,881 using the Hagen Poiseuille equation:

$$\mu = K \frac{\Delta P_\rho}{m}$$

$\mu$ = Viscosity of the fluid $K$ = A constant determined for the individual meter $\Delta P$ = Differential pressure $\rho$ = Density of the fluid $m$ = Mass flow rate of the fluid The only unknown in equation 25 at this point is the velocity through the throat of the venturi which can be determined by iteratively solving the equation. Once the throat velocity $V_t$ is known, the throat mass flow rate can be determined (velocity times density times throat area). The total conduit mass flow rate is simply the sum of the flowmeter and venturi throat mass flow rates. The calculations outlined above are easily and quickly performed by use of a microprocessor such as already exists in the Micro Motion model RFT 9739 which may comprise meter electronics 114 and which is available from Micro Motion, Inc., in Boulder, Colo. 80301. The geometry of FIG. 1 can determine conduit material mass flow rate with higher precision than present bypass flowmeters by use of a standard Coriolis mass flowmeter in conjunction with a venturi, and, if necessary, a differential pressure gage.

The RFT 9739 (meter electronics 114) is currently programmed and operational to derive mass flow rate, volumetric flow rate and density information for the material flowing through an associated Coriolis flowmeter such as element 104 on FIG. 1. If the flowmeter is also equipped with a differential pressure sensor, the RFT 9739 can also derive material viscosity information. In accordance with the present invention, the RFT 9739 solves equation 25 for Vt after being programmed with constants representing the flowmeter and conduit geometry such as Lm, dm, Lv, dv, etc. It then derives the mass flow rate in the venturi and then in the entirety of the conduit. In accordance with spirit of the invention, the RFT 9739 can also derive conduit material mass flow rate information based upon geometries using other fluid equations.

Equation 25 was derived for the preferred embodiment in which a venturi in the conduit is used to increase the flow rate through the Coriolis meter. It can be shown through similar analysis that equation 25 also is true for the embodiment of FIG. 8 where there is no venturi in the conduit. In this embodiment, without the venturi, the venturi length, Lv of equation 25, becomes the distance in the conduit between the flowmeter bypass inlet and outlet, the venturi diameter (dv) becomes the conduit diameter, and the venturi throat velocity (Vt) becomes the conduit fluid velocity between the flowmeter bypass inlet and outlet.

Figure 8:
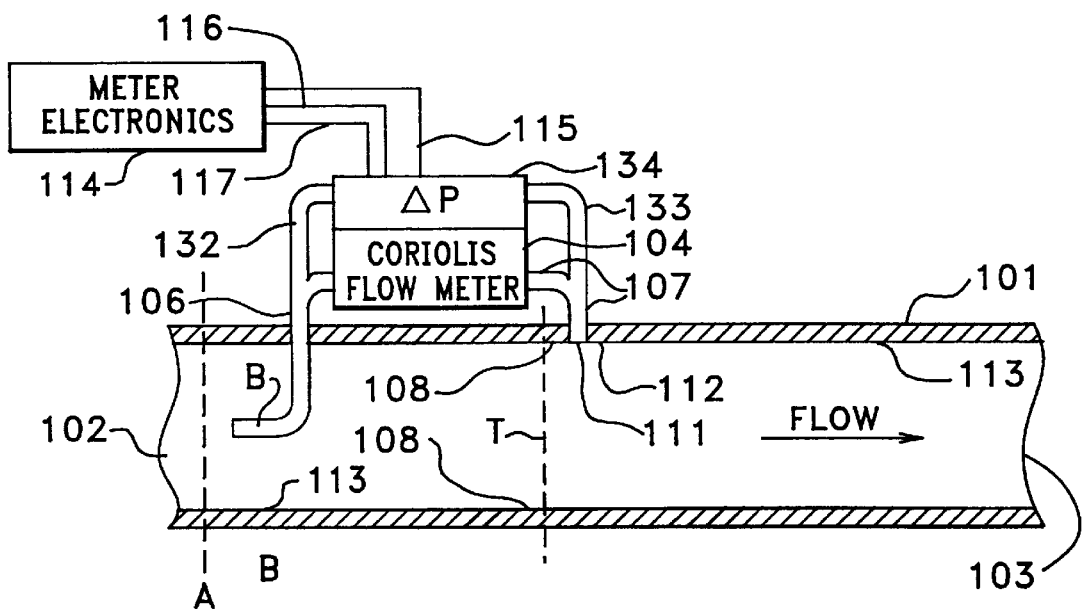
FIG. 8 discloses an alternative to that of FIG. 1 wherein a venturi is not present inside the conduit.

Since equation 25 also applies to non-venturi Coriolis bypass flowmeters, as well as venturi flowmeters, as shown in FIG. 8, correction can be made for variations in bypass ratio of these non-venturi meters resulting in improved accuracy over prior art bypass meters. The preferred embodiment, however, contains a venturi which further enhances accuracy by increasing the amount of flow through the Coriolis meter.

Figure 9:
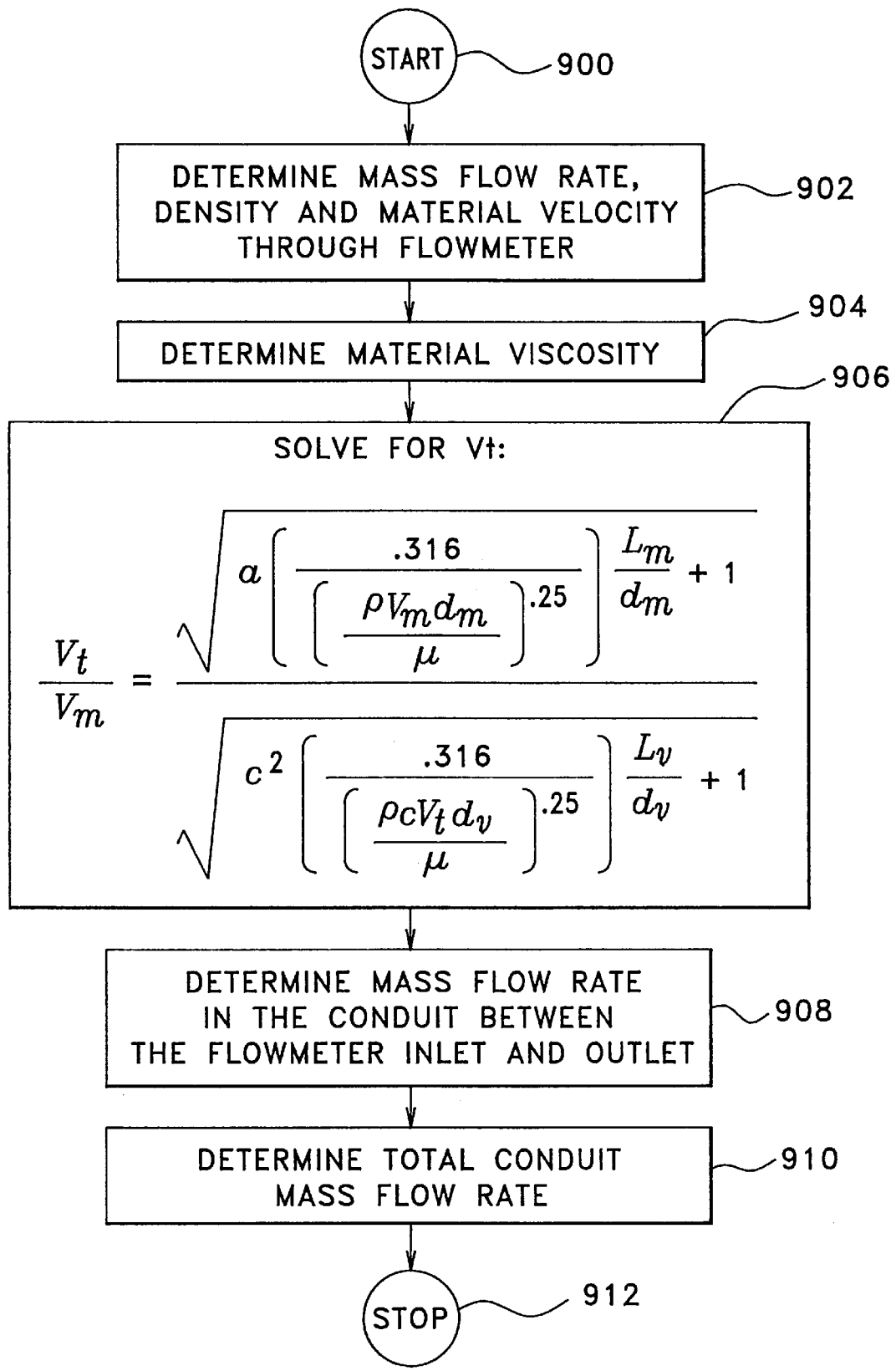
FIG. 9 is a flow chart of the processing steps utilized in the present invention.

Description of FIG. 9

FIG. 9 is a flow chart illustrating the preceding description and equations which disclose the steps of the process by which the present invention derives the total mass flow rate in a conduit coupled to a bypass type flowmeter.

Processing begins with element 900 and proceeds to step 902. Step 902 operates to determine the mass flow rate, density and material velocity through the bypass flowmeter. The Coriolis bypass flowmeter measures the mass flow rate and density of the material through the bypass flowmeter. This information is used, knowing the geometry of the bypass flowmeter, to derive the material velocity through the bypass flowmeter. Processing then proceeds to step 904 of FIG. 9.

The material viscosity is determined during step 904. This step is not necessary if the material viscosity is known or constant. As described above with respect to FIGS. 1–3, a differential pressure sensor is used in conjunction with the Coriolis bypass flowmeter to determine the material viscosity. After determining the material viscosity, processing continues to step 906.

During step 906 equation 25 is solved for Vt, the throat velocity. The other components of equation 25 include values already measured in steps 902–904 and flowmeter conduit geometry constants. Equation 25 which is solved for Vt during step 906 is the same whether a venturi is used, as in FIG. 1 or not, as in FIG. 8. Processing next proceeds to step 908.

During step 908 the mass flow rate through the conduit between the bypass flowmeter inlet and outlet is calculated. The throat velocity Vt (solved for during step 906) is multiplied by the material density (measured in step 902) the product of which is multiplied by the transverse area at the point for which the throat velocity is calculated. Processing next proceeds to step 910.

During step 910 the material mass flow rate through the conduit between the flowmeter inlet and outlet (determined during step 908) is added to the material mass flow rate through the Coriolis bypass flowmeter (measured during step 902) to determine the total conduit mass flow rate. Once the total material mass flow rate is determined during step 910, processing concludes with element 912.

Description of FIGS. 4 and 5

FIGS. 4 and 5 disclose an alternative embodiment of the invention comprising a bypass flowmeter 400 inserted within the interior of conduit 101. Conduit 101 has an upstream end 102 and a downstream end 103 as shown for conduit 101 on FIGS. 1 and 2. Bypass flowmeter 400 has an upstream end with an opening 402 and body surfaces 401. Flowmeter 400 further has a downstream end comprising tip 407 and body surfaces 406. Flowmeter 400 further has a middle portion comprising outer shell 404. Outer shell 404 encloses a hollow chamber 427 through which flow channels 409 and 411 pass. Flow channel 409 includes an inlet portion 412 which is connected to opening 402. Flow channel 409 further includes an outlet portion 414 connected to element 434 which has an opening flush with surface 406 proximate the throat T of the venturi. Flow channel 411 includes an upstream inlet 413 connected to opening 402. It further includes an outlet 415 connected to channel 434 having an opening flush with surface 406 proximate the throat portion T of the venturi. The hollow chamber 427 also contains driver 417 and sensors 421 and 423 between flow channels 409 and 411. Brace bars 424 and 425 interconnect the walls of flow tubes 411 and 409. Driver 417 comprises a coil and magnet M combination in the mid portion of hollow chamber 427. Driver 417 is energized by a drive signal received over path 115 which vibrates the flow tubes 409 and 411 at their resonant frequency when material flows therein. Chamber 427 further includes a pair of sensors 421 and 423, each comprising a coil and magnet M combination which detect the transverse movements of flow tubes 409 and 411 as they are vibrated at their resonant frequency by driver 417 under control of the drive signals received on path 115. The oscillations detected by sensors 421 and 423 are extended over path 116 to meter electronics 114 which, in a well known manner, determines the phase difference between the received signals. The phase difference between these signals is indicative of the mass flow rate of the material in flow channels 409 and 411. Meter electronics 114 also determines the density of the flowing material from the frequency of the oscillations applied to path 115. The meter electronics uses the mass flow and density information together with pre-programmed information regarding the relative diameters of the flow channels 409 and 411 and the diameter of conduit 101 to determine the mass flow rate and other desired information for the entirety of the material flowing within the interior of conduit 101.

It should be noted that the exit opening of outlet 434 is positioned proximate the throat T of the venturi formed by surfaces 406. This permits the flowmeter 400 to be subjected to an optimum pressure drop between its outlet 434 and its inlet 402. In so doing, the flowmeter of FIG. 4 operates in the same manner as previously described for the flowmeter 104 of FIGS. 1 and 2 to derive the desired information for the entirety for the material flowing within the interior of conduit 101.

FIG. 5 is an end view of the embodiment of FIG. 4 and illustrates a pair of struts 501 and 502 connecting the outer surface of flowmeter 400 to the inner surface of conduit 101. Conductors 115–117 extend through the center of strut 501 to connect meter electronics to flowmeter 400.

Insertion Coriolis flowmeter 400 also contains a differential pressure sensor 435 which is positioned within the hollow chamber 427 and is connected by tube 432 to upstream opening 402 and is further connected by tube 433 whose outlet end 416 joins the material outlet 434 of the flowmeter. Differential pressure gauge 435 detects the pressure difference between the material inlet 402 of flowmeter 400 and the material outlet 434 of flowmeter 400. This pressure differential information is applied to meter electronics 114 over path 115 on FIG. 5 which uses this pressure differential information to derive the viscosity for the flowing material.

The flowmeter 400 may be operated without the differential pressure sensor 435 in installations in which the flowing material in conduit 101 has a near constant viscosity such as is the case for water, or when the material has a viscosity that is a known function of temperature which is measured by the flowmeter. However, in applications in which the viscosity is unknown, the differential pressure sensor 435 can derive the material viscosity. The viscosity information then can be used in equation 24 to derive the ratio between the velocity of the material flow within the venturi throat to that of the flowmeter material velocity. Having determined the velocity within the throat and the flowmeter, the mass flow rate for the material in the throat can be derived from the following relationships:

$$V_t = \frac{\dot{M}_t}{\rho A_t}$$

$V_t$ = material velocity $M_t$ = mass flow rate $A_t$ = throat cross section area $\rho$ = material density $\dot{M} = \rho VA$ This mass flow rate in the entirety of the conduit is the sum of the mass flow rate in the throat and the mass flow rate through the Coriolis flowmeter.

Figure 6:
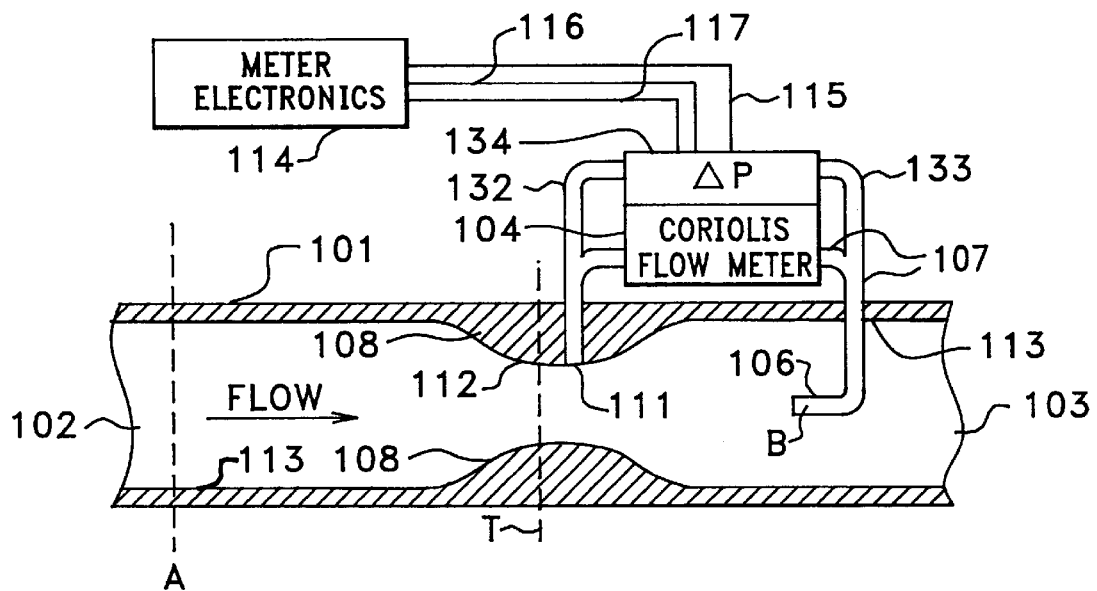
FIG. 6 discloses an alternative arrangement similar to that of FIG. 1 except that material inlet 106 is positioned downstream of material outlet 111.

Description of FIG. 6

FIG. 6 discloses a bypass Coriolis flowmeter system similar to that of FIG. 1. The difference is that in the system of FIG. 6 the flowmeter inlet 106 is positioned downstream of outlet 111. In FIG. 6, some of the material in conduit 101 will flow into inlet 106, through flowmeter 104 and outlet 111 back into the interior of the conduit. The material flows in that direction since the material pressure at inlet 106 is greater than that at outlet 111 due to the low pressure at the throat T of the venturi.

Figure 7:
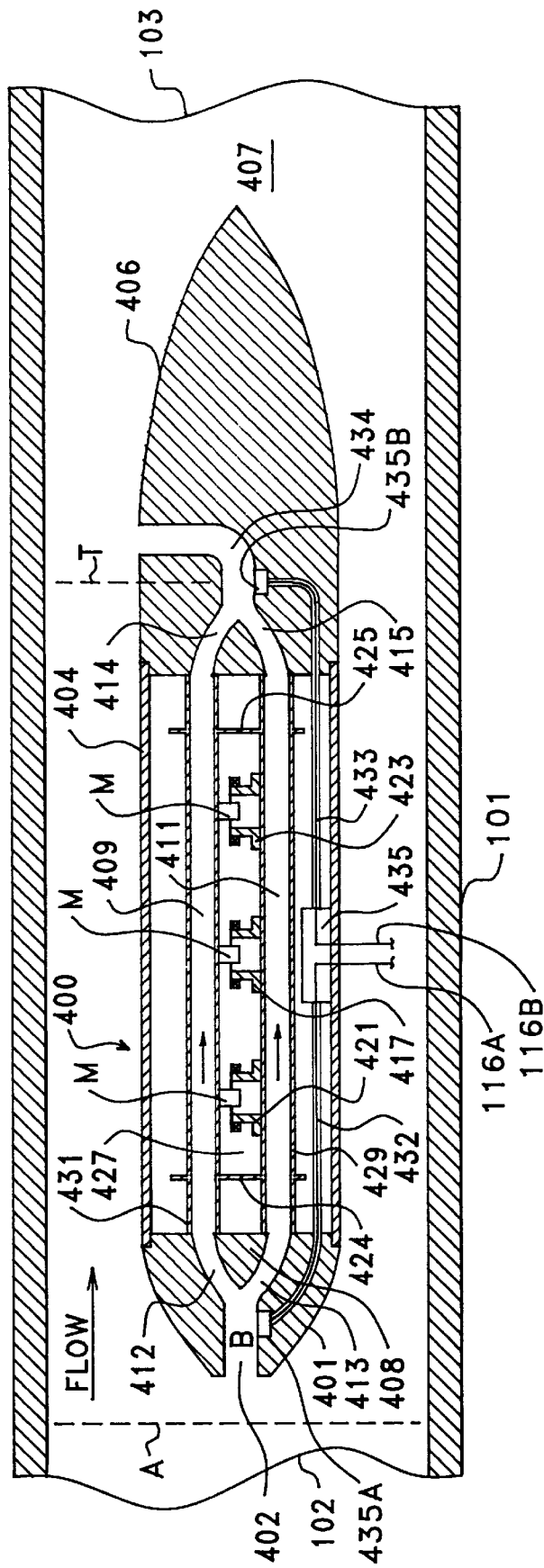
FIG. 7 discloses an arrangement similar to that of FIG. 4 except that a pair of separate pressor sensors 435A and 435B are positioned at the ends of tubes 432 and 433.

Description of FIGS. 7 and 8

A single differential pressure sensor 435 together with tubes 432 and 433 as shown on FIG. 4 is not necessary and if desired, can be replaced with two separate pressure sensors 435A and 435B, one of which can be positioned at the terminus of tube 432 at material inlet 402. The other can be positioned at the terminus of tube 433 at material outlet 434. The signals from these two individual pressure gauges can then be applied over conductors 116A and 116B to meter electronics 114 (not shown on FIG. 7) which can then operate in the same manner as described for FIGS. 4 and 5 for the use of a single differential pressure gauge 435 to derive material viscosity. Driver 417 and sensors 421, 423 on FIG. 7 may be connected by conductors to meter electronics 114, 115 and 117 in the same manner as shown on FIG. 5.

FIG. 8 discloses an embodiment similar to FIG. 1 except the interior of conduit 101 is devoid of the venturi structure 108. Inner surface 113 of conduit 101 is substantially flat and the material flow through flowmeter 134 is due to the conduit pressure drop between the flowmeter inlet B and outlet 111. The principal of operation of the embodiment of FIG. 8 is the same as that of FIG. 1.

It is to be expressly understood that the claimed invention is not to be limited to the description of the preferred embodiment, but encompasses other modifications and alterations within the scope and spirit of the inventive concept. For example, the invention has been described with reference to the use of Coriolis flowmeters 104 and 400. The invention is not so limited and if desired, may be operated with a volumetric flowmeter as element 104 if the material density is constant. When so operated, a volumetric flowmeter having an inlet positioned shown, or element 106 in FIG. 1, and having an outlet positioned proximate the throat T of a venturi may be advantageously subjected to an optimum pressure drop which will permit the flowmeter to operate in an optimum manner to determine the volume of the material flowing there through and in turn, the volume of the material flowing in the entirety of conduit 101. Furthermore, the same approach may be applied to different geometries and flow conditions where the specific equations may differ. But the method of determining the relevant material parameters and compensating for variations in the bypass ratio is still valid.

In summary, it is desirable to use bypass meters on large conduits conducting high rates of material flow. Existing bypass meters, however, lack the high accuracy required of many applications because the bypass ratio varies with the material parameters. The Coriolis flowmeters of the present invention enhance their accuracy without the penalty of permanent material pressure drop. This is achieved by use of a venturi to increase the portion of flow that goes through the Coriolis meter. Furthermore, the fluid dynamic equations associated with a venturi based bypass meter enable the bypass ratio to be calculated from the meter geometry and the fluid's relevant properties. The Coriolis meters of the present invention continuously measure the relevant material properties and continuously calculate the bypass ratio and total mass flow rate.

We claim:

1. Flow measurement apparatus for measuring material flow in a conduit, said apparatus comprising:
   a flowmeter;
   a material inlet for diverting some of said material flow in said conduit to said flowmeter, wherein said material inlet is positioned within an interior of said conduit and coupled to said flowmeter;
   a material outlet for returning material flowing in said flowmeter to said conduit, wherein said material outlet is positioned within said interior of said conduit and coupled to said flowmeter;
   means for determining the mass flow rate and flow velocity and density of said material flow in said flowmeter;
   means responsive to said determination of said mass flow rate and said flow velocity and density of said material flow in said flowmeter for determining the flow velocity and mass flow rate of said material in a portion of said conduit between said material inlet and said material outlet; and
   means responsive to said determination of said mass flow rate in said flowmeter and in said conduit portion for determining a total mass flow rate of said material in said conduit.

2. The apparatus of claim 1 wherein said means for determining said flow velocity and mass flow rate of said material in a portion of said conduit between said material inlet and said material outlet comprises a means for determining the ratio of the flow velocity between said material in said flowmeter and said material in said portion of said conduit.

3. The apparatus of claim 1 further comprising:
   means for determining the viscosity of said material in said flowmeter;
   means responsive to said determination of said viscosity and to said determination of said flow velocity and said mass flow rate and said density of said material in said flowmeter for determining said flow velocity and said mass flow rate of said material in said portion of said conduit; and
   said means responsive to said determination of said flow velocity and mass flow rate of said material in said conduit portion determines said total material mass flow rate in said conduit.

4. The apparatus of claim 3 wherein said means for determining said flow velocity and mass flow rate of said material in said portion of said conduit between said material inlet and said material outlet comprises a means for determining the ratio of the flow velocity between said material in said flowmeter and said material in said portion of said conduit.

5. The apparatus of claim 1 wherein said flowmeter comprises a Coriolis mass flowmeter.

6. The apparatus of claim 5 wherein said Coriolis mass flowmeter further comprises:
   pressure sensing means coupled to said material inlet and to said material outlet for producing a measurement of a material pressure drop between said material inlet and said material outlet; and
   means responsive to said measurement of said material pressure drop for determining the viscosity of said flowing material.

7. The apparatus of claim 6 wherein said means for determining said total mass flow rate of said material in said conduit comprises:
   said means for determining said flow velocity and said mass flow rate of said material in said flowmeter as well as said material density and said material viscosity; and
   said means responsive to said determination of said flow velocity, mass flow rate, density and viscosity of said material in said flowmeter determines said mass flow rate of said material in said portion of said conduit between said material inlet and said material outlet.

8. The apparatus of claim 1 wherein said flowmeter is a volumetric flowmeter.

9. The apparatus of claim 1 further comprising:
   means for increasing said flow velocity of said material in said conduit at a conduit location proximate said material outlet between said material inlet and said material outlet; said material outlet being coupled to said conduit at said location having an increased flow velocity of said material in said conduit for generating an optimum pressure drop between said material inlet and said material outlet to increase said flow velocity of said material within said flowmeter.

10. The apparatus of claim 9 wherein said flowmeter comprises a Coriolis mass flowmeter.

11. The apparatus of claim 10 wherein said Coriolis mass flowmeter further comprises:
    pressure sensing means coupled to said material inlet and to said material outlet for producing a measurement of a material pressure drop between said material inlet and said material outlet; and
    means responsive to said measurement of said material pressure drop for determining the viscosity of said flowing material.

12. The apparatus of claim 11 wherein said means for determining said total mass flow rate of said material in said conduit comprises:
    said means for determining said flow velocity and said mass flow rate and said density as well as said viscosity of said material in said flowmeter;
    means responsive to said determination of flow velocity, mass flow rate, density and viscosity of said material in said flowmeter for determining said flow velocity and mass flow rate of said material in said conduit portion of increased flow velocity; and
    said means responsive to said determination of said flow velocity and mass flow rate of said material in said conduit portion determines said total mass flow rate of said material in said conduit.

13. The apparatus of claim 9 wherein said flowmeter is a Coriolis mass flowmeter; and
    wherein said means for determining said material flow velocity and said mass flow rate of said material in said portion of said conduit between said material inlet and said material outlet comprises a means for determining the ratio of the flow velocity between said material in said flowmeter and said material in said portion of said conduit.

14. The apparatus of claim 13 wherein said Coriolis mass flowmeter further comprises:
pressure sensing means coupled to said material inlet and said material outlet for measuring the material pressure drop between said material inlet and said material outlet; and
means responsive to said measurement of said material pressure drop for determining the viscosity of said flowing material.

15. The apparatus of claim 14 wherein said means for increasing said flow velocity of said material comprises a venturi positioned internal to said conduit; and
wherein said material outlet is coupled to a throat area of said venturi.

16. The apparatus of claim 13 wherein said venturi is affixed to the inner surface of said conduit.

17. The apparatus of claim 15 wherein said venturi and said throat area are spaced apart from the inner surfaces of said conduit.

18. The apparatus of claim 13 wherein said Coriolis mass flowmeter is positioned external to said conduit.

19. The apparatus of claim 1 wherein said material outlet is positioned upstream of said material inlet in said conduit.

20. The apparatus of claim 1 wherein said material outlet is positioned downstream of said material inlet in said conduit.

21. The apparatus of claim 20 wherein said Coriolis mass flowmeter is positioned within said conduit.

22. The apparatus of claim 21 wherein said Coriolis mass flowmeter comprises:
an elongated body positioned internal to said conduit with said body and said conduit having parallel longitudinal axes;
an upstream end of said body having said material inlet for receiving material to be extended through said Coriolis mass flowmeter;
a downstream end portion of said body having said material outlet for discharging material from said body back to said interior of said conduit;
a pair of parallel flow channels within said body having longitudinal axes parallel to said longitudinal axis of said body;
means coupling the downstream end portion of said flow channels with said downstream end portion of said body;
means coupling the upstream end portion of said flow channels with said upstream end portion of said body;
wherein material that enters said inlet of said body is extended through said flow channels and said outlet of said body and is returned back to said material flowing in said conduit;
means for vibrating said channels transversely and longitudinally with respect to each other; and
means including sensor means coupled to said flow channels and responsive to said vibrating while material flows through said flow channels for determining said total material mass flow rate in said conduit.

23. The apparatus of claim 22 wherein said downstream end portion of said body comprises a venturi and wherein said outlet of said body is positioned proximate the throat of said venturi.

24. The apparatus of claim 23 wherein said Coriolis mass flowmeter further comprises:
pressure sensing means coupled to said material inlet and said material outlet for measuring the material pressure drop between said inlet and said outlet;
means responsive to said measurement of said material pressure drop for determining the viscosity of said flowing material; and
means responsive to said determining of said viscosity to determine the flow velocity and mass flow rate of said material in said venturi and, in turn, the total mass flow rate of said material in said conduit.

25. A method of measuring material flow in a conduit; said method comprising the steps of:
diverting some of the material flow in a conduit to a flowmeter having a material inlet positioned within an interior of said conduit and coupled to said flowmeter;
returning material flowing in said flowmeter to said conduit via a material outlet positioned within said interior of said conduit and coupled to said flowmeter;
determining flow velocity and mass flow rate and density of said material in said flowmeter;
determining flow velocity and mass flow rate of said material in a portion of said conduit between said material inlet and said material outlet in response to said determination of flow velocity and mass flow rate and density of said material in said flowmeter; and
determining a total mass flow rate of said material in said conduit in response to said determination of said flow velocity and mass flow rate of said material in said flowmeter and of said material in said conduit portion.

26. The method of claim 25 wherein said flowmeter comprises a Coriolis mass flowmeter.

27. The method of claim 25 including the steps of:
coupling pressure sensing means to said material inlet and to said material outlet for producing a measurement of a material pressure drop between said material inlet and said material outlet; and
determining the viscosity of said flowing material in said flowmeter in response to said measurement of said material pressure drop.

28. The method of claim 27 including the steps of:
determining said flow velocity and said mass flow rate as well as said density and said viscosity of said material in said flowmeter;
determining the flow velocity and mass flow rate of said material in said conduit portion in response to said determination of said flow velocity, mass flow rate, density and viscosity of said material in said flowmeter, and
said step of determining said total mass flow rate of said material in said conduit.

29. The method of claim 25 further comprising the steps of:
increasing said flow velocity and mass flow rate of said material at a conduit portion proximate said material outlet; and
coupling said material outlet to said conduit at said location having an increased flow velocity and mass flow rate for generating an optimum pressure drop between said material inlet and said material outlet of said flowmeter to increase said material flow within said flowmeter.

30. The method of claim 29 wherein said flowmeter is a Coriolis mass flowmeter; and wherein said step of determining flow velocity and mass flow rate of said material in said portion of said conduit between said material inlet and said material outlet comprises a step of determining the ratio of the flow velocity between said material in said flowmeter and said material in said portion of said conduit.

31. The method of claim 30 including the steps of:

measuring a material pressure drop between said material inlet and said material outlet; and determining the viscosity of said flowing material in response to said measurement of said material pressure drop.

32. The method of claim 31 including the steps of:

determining said flow velocity and said mass flow rate as well as said density and said viscosity of said material in said flowmeter;

determining said flow velocity and mass flow rate of said material in said conduit portion of increased flow velocity in response to said determination of said flow velocity, mass flow rate, density and viscosity of said material in said flowmeter, and said step of determining said total mass flow rate of said material in said conduit in response to said determination of said flow velocity and mass flow rate of said material in said flowmeter and of said material in said conduit portion.

33. The method of claim 29 including the step wherein said increased flow velocity is obtained by positioning said material outlet proximate a throat of a venturi.

34. The method of claim 33 wherein said method further comprises the steps of:

operating pressure sensor means coupled to said flowmeter for measuring the material pressure drop between said material inlet and said material outlet of said flowmeter; and determining the viscosity of said material flow in said flowmeter in response to said measurement of said material pressure drop.

35. The method of claim 25 including the steps of:

positioning an elongated body positioned of a Coriolis mass flowmeter internal to said conduit with said body and said conduit having parallel longitudinal axes;

extending material received by an upstream end portion of said body having said material inlet through said Coriolis mass flowmeter;

discharging material from said body back to said interior of said conduit via a downstream end portion of said body having said material outlet;

a pair of parallel flow channels within said body having longitudinal axes parallel to said longitudinal axes of said body;

connecting the downstream ends of said flow channels with said downstream end portion of said body;

connecting the upstream end portions of said flow channels with said upstream end portion of said body;

wherein material that enters said material inlet of said body is extended through said flow channels and said material outlet of said body and is returned back to said material flowing in said conduit;

vibrating said flow channels transversely with respect to each other; and operating sensor means responsive to said vibrating while material flows through said channels for determining information pertaining to said material flow in said conduit.

36. The method of claim 35 including the steps of:

positioning said material outlet of said body proximate a throat of a venturi formed by said body.

37. The method of claim 36 including the steps of:

operating pressure sensor means coupled to said body for measuring the material pressure drop between said material inlet and said outlet of said flowmeter body;

determining the viscosity of said material flow in said flowmeter in response to said measurement of said material pressure drop; and determining said total mass flow rate of said material in said conduit in response to said viscosity determination.

* * * * *

UNITED STATES PATENT AND TRADEMARK OFFICE
CERTIFICATE OF CORRECTION

PATENT NO. : 5,861,561
DATED : January 19, 1999
INVENTOR(S) : Craig Brainerd Van Cleve and Roger Scott Loving It is certified that error appears in the above-identified patent and that said Letters Patent is hereby corrected as shown below:

Column 9,
Line 39, delete "n=constant (function of bend radius divided by tube diam-"
Line 40, delete "eter"
Line 45, replace "tiplied by a constant" with -- tiplied by a constant which is a function of meter geometry. --.
Line 50, replace "a = constant based on the flowmeter" with -- a = constant based on the flowmeter geometry --.

Column 17,
Line 19, replace "13" with -- 15 --.

Signed and Sealed this

Tenth Day of February, 2004

JON W. DUDAS
*Acting Director of the United States Patent and Trademark Office*